United States Patent
Tran

(10) Patent No.: US 9,319,388 B2
(45) Date of Patent: Apr. 19, 2016

(54) CRYPTOGRAPHIC KEY PAIR GENERATION SYSTEM

(71) Applicant: Bank of America Corporation, Charlotte, NC (US)

(72) Inventor: Sylvan Tran, Corona, CA (US)

(73) Assignee: Bank of America Corporation, Charlotte, NC (US)

( * ) Notice: Subject to any disclaimer, the term of this patent is extended or adjusted under 35 U.S.C. 154(b) by 8 days.

(21) Appl. No.: 14/471,045

(22) Filed: Aug. 28, 2014

(65) Prior Publication Data

US 2016/0065545 A1 Mar. 3, 2016

(51) Int. Cl.
*H04L 29/06* (2006.01)

(52) U.S. Cl.
CPC .......... *H04L 63/0442* (2013.01); *H04L 63/062* (2013.01); *H04L 63/0853* (2013.01)

(58) Field of Classification Search
CPC ........................................................ G06F 21/32
USPC ......................................................... 713/171
See application file for complete search history.

(56) References Cited

U.S. PATENT DOCUMENTS

| 8,886,953 B1* | 11/2014 | Sipe | G06F 21/32 |
| | | | 713/186 |
| 2005/0246763 A1* | 11/2005 | Corcoran | G06F 21/10 |
| | | | 726/3 |

OTHER PUBLICATIONS

Chuang et al., I Think, Therefore I Am: Usability and Security of Authentication Using Brainwaves, 2013, http://link.springer.com/chapter/10.1007%2F978-3-642-41320-9_1.*
S. Tran, U.S. Appl. No. 14/471,141, filed Aug. 28, 2014, 36 pages.

* cited by examiner

*Primary Examiner* — Andrew Nalven
*Assistant Examiner* — Khang Do
(74) *Attorney, Agent, or Firm* — Michael A. Springs

(57) ABSTRACT

In certain embodiments, a system communicates a request for a user to provide a thought to facilitate generating a cryptographic key pair. The system receives a string of characters corresponding to the thought. The string of characters may be generated based at least in part upon electromagnetic signals, which the user generates by developing the thought. The system generates a cryptographic key pair based at least in part upon the string of characters. The generated cryptographic key pair may be configured to encrypt and decrypt messages.

8 Claims, 3 Drawing Sheets

CRYPTOGRAPHIC KEY PAIR GENERATION SYSTEM

TECHNICAL FIELD

This invention relates generally to cryptography, and more particularly to cryptographic key pair generation.

BACKGROUND

Enterprises and individuals employ various systems to ensure data is kept secure and is able to be accessed only by those with proper authority. Enterprises commonly generate cryptographic key pairs in order to securely encrypt and decrypt sensitive data using Public-Key cryptography. Currently, systems for generating a secure cryptographic key pair are limited.

SUMMARY OF EXAMPLE EMBODIMENTS

According to embodiments of the present disclosure, disadvantages and problems associated with neural authentication of a user may be reduced or eliminated.

In certain embodiments, a system receives electromagnetic signals associated with a user to facilitate authenticating the user. The user may generate the received electromagnetic signals by developing a thought. The system generates a string of characters corresponding to the thought of the user based at least in part upon the electromagnetic signals.

In certain embodiments, a system receives a first request from a user to perform a function with an enterprise. The system communicates a second request for the user to provide a thought to facilitate authenticating the user with the enterprise. The system receives a string of characters corresponding to the thought. The string may be generated based at least in part upon electromagnetic signals, which the user generates by developing the thought. The system compares the received string to a stored string that corresponds to a thought of the user to authenticate the user. Based at least in part upon the comparison, the system determines whether the user is authenticated to perform the function.

In certain embodiments, a system communicates a request for a user to provide a thought to facilitate generating a cryptographic key. The system receives a string of characters corresponding to the thought. The string of characters may be generated based at least in part upon electromagnetic signals, which the user generates by developing the thought. The system generates a cryptographic key pair based at least in part upon the string of characters. The generated cryptographic key pair may be configured to encrypt and decrypt messages.

Certain embodiments of the present disclosure may provide one or more technical advantages. In certain embodiments, a system for cryptographic key generation may generate a random string of numbers from the electromagnetic signals created by a user developing a thought used to create higher quality random numbers to facilitate generating a secure cryptographic key pair, thereby conserving the computational resources necessary to create a similar high quality random number that would be consumed by another program. Having a truly random number as a seed value for a cryptographic key generation system allows for a more secure key pair and mitigates the risk of successful fraudulent attempts to replicate the key pair.

In certain embodiments, a system for neural authentication of a user provides a trigger to initiate the user's thoughts in order to authenticate the user to reduce the amount of time a user must occupy the authentication interface while trying to remember the correct thought to authenticate or correct password, thereby conserving the computational resources necessary to authenticate a user to perform a function.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
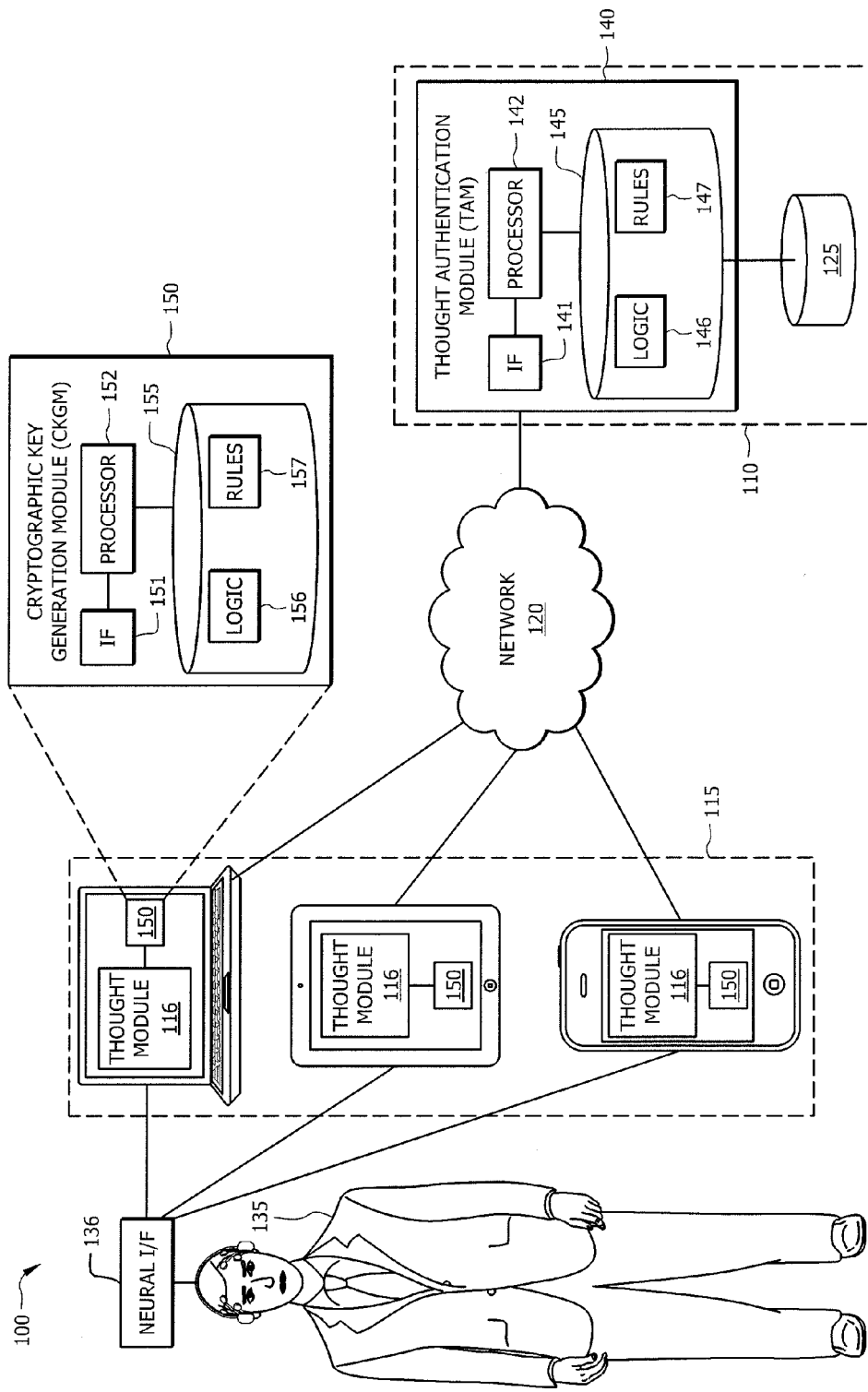
FIG. 1 illustrates an example of a system that facilitates neural authentication and cryptographic key generation.
Figure 2:
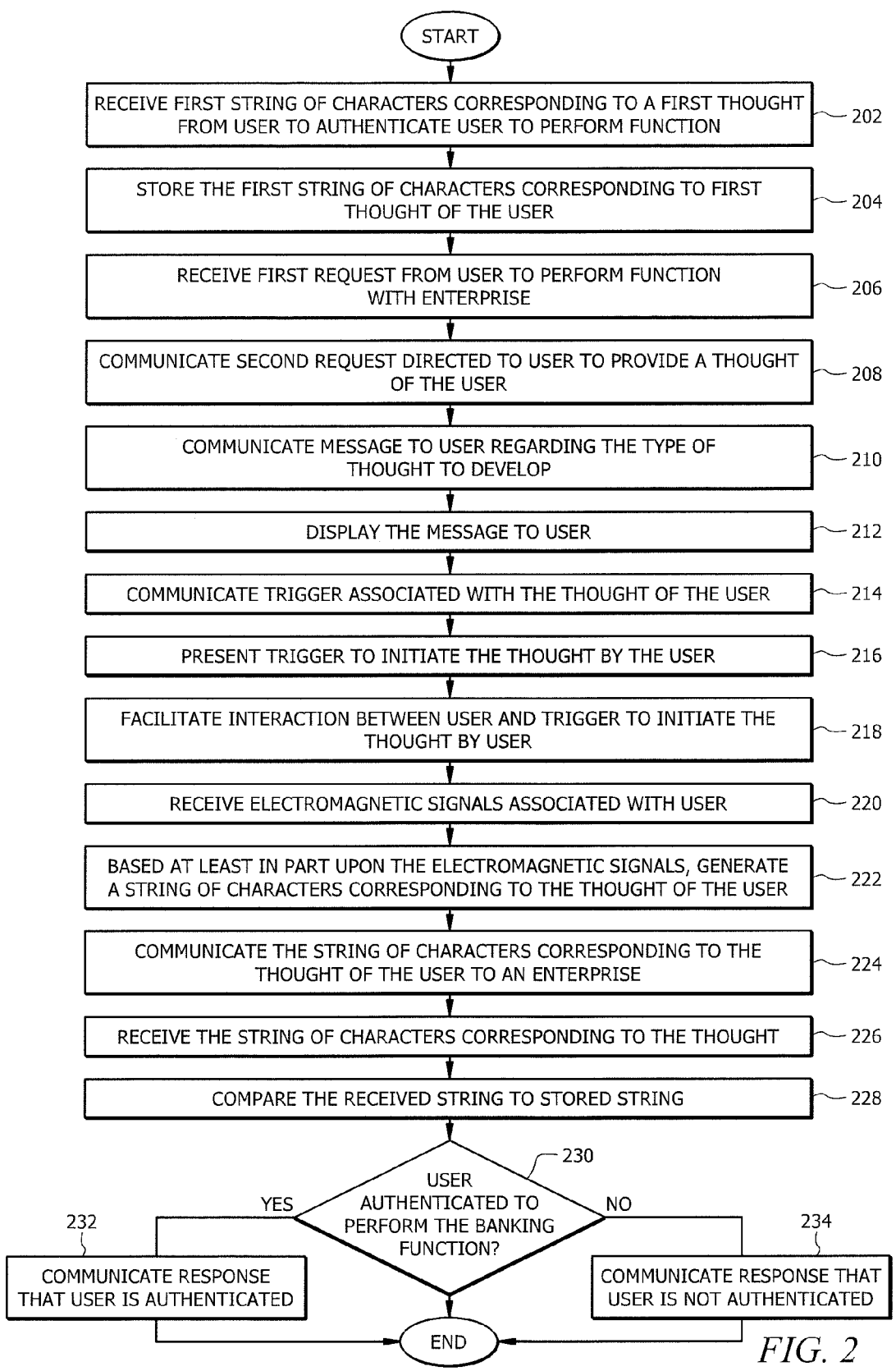
FIG. 2 illustrates an example flowchart for facilitating neural authentication.
Figure 3:
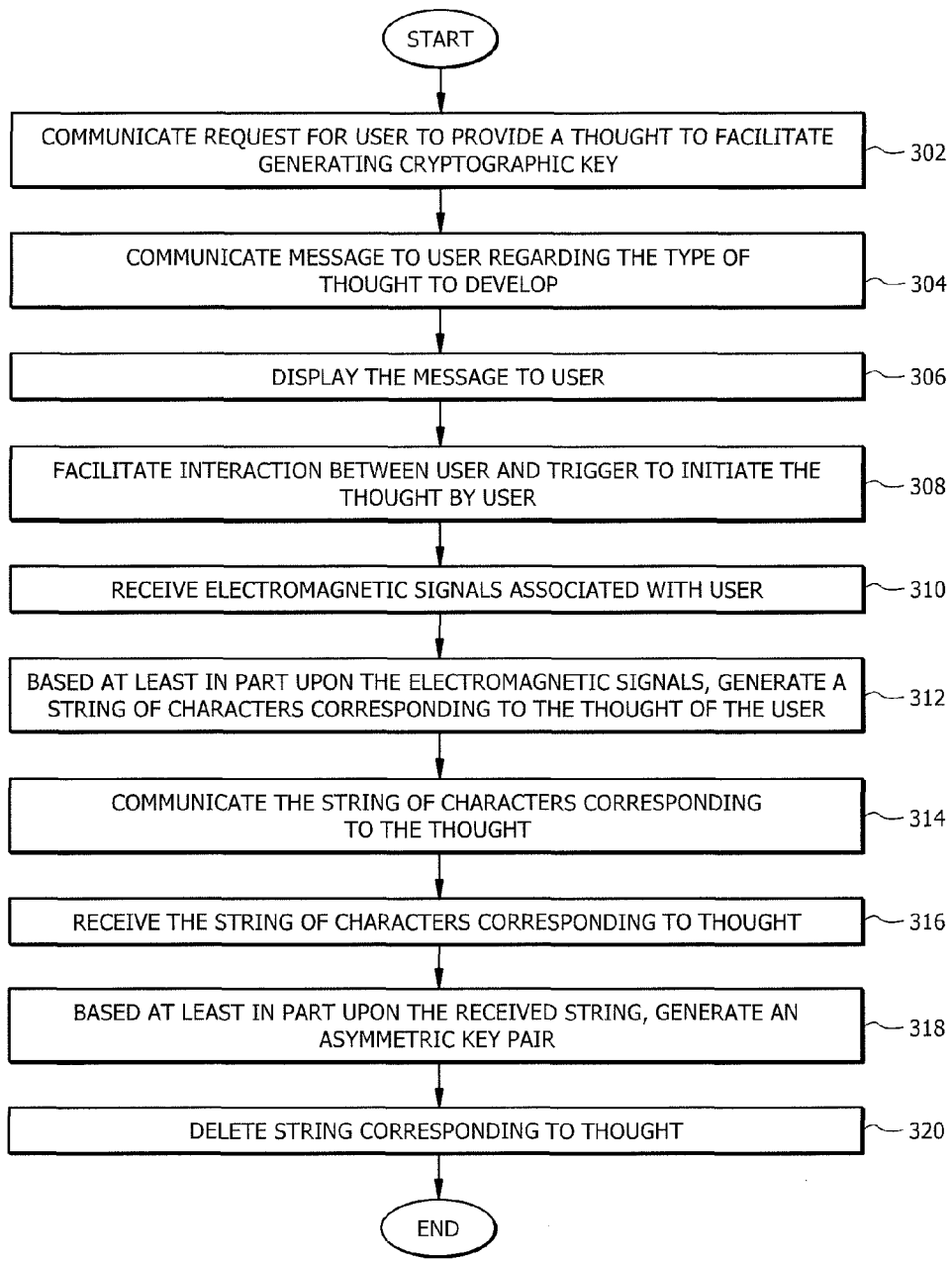
FIG. 3 illustrates an example flowchart for facilitating cryptographic key generation.

Embodiments of the present invention and its advantages are best understood by referring to FIGS. 1-3, like numerals being used for like and corresponding parts of the various drawings.

Business enterprises may require computerized digital authentication in order to allow a user to perform a function with the enterprise. Companies may require authentication before allowing a user to perform a function or access an area or information. For example, a user must be authenticated before accessing a physical building, making a purchase online, unlocking a mobile phone, or logging on to a website. Specifically, banks and other financial institutions that conduct transactions with customers may perform due diligence to ensure user data is kept safe and confidential. For example, financial institutions may perform due diligence to verify the identity of a user. Examples of such transactions include, but are not limited to, requesting a balance inquiry, depositing funds, withdrawing funds, transferring funds, changing an address, and changing a PIN. Typically, the information gathered to verify the identity of a user may be limited. Normally, the information gathered includes an alphanumeric password of limited length that the user provides to access an account. The teachings of the disclosure recognize that it would be desirable to require a more unique and less easily discovered password for a user to provide.

As another example, business enterprises may perform due diligence to ensure data is kept confidential by using cryptography to encrypt and decrypt information securely. For example, business enterprises may use cryptographic keys to ensure that only the appropriate person may decrypt the information using a private cryptographic key. Typically, the generation of cryptographic keys is limited by only being able to use pseudo-random numbers as seeds, which may result in the generated keys being easy to duplicate. The teachings of the disclosure recognize that it would be desirable to provide a truly random numbers as seeds when generating cryptographic key pairs.

FIG. 1 illustrates an example of system 100 that facilitates neural authentication and cryptographic key generation. System 100 may include enterprise 110, one or more user devices 115, one or more users 135, one or more Thought Authentication Modules (TAMs) 140, one or more Cryptographic Key Generation Modules (CKGMs) 150, network 120, and thought database 125. Enterprise 110 is generally operable to facilitate thought authentication and user device 115 is generally operable to facilitate cryptographic key generation, as described below. Enterprise 110 may be any entity, object, item, or location that requires authentication from user 135. For example, enterprise 110 may be a website, door to a building, device (e.g., phone, laptop, computer, tablet), or confidential information.

User 135 represents a person capable of generating electromagnetic signals by developing one or more thoughts in the brain of user 135. In some embodiments, user 135 may be a customer of enterprise 110 who uses financial products or financial services of enterprise 110. For example, user 135 may utilize neural interface 136 to capture thoughts of user 135 in order to have TAM 140 authenticate user 135. In some embodiments, user 135 may be a current customer, a potential customer, a person who is not a customer, an employee, or any person with a relationship with enterprise 110. For example, user 135 may utilize neural interface 136 to capture the thoughts of user 135 to facilitate CKGM 150 generating cryptographic keys.

User device 115 may refer to any device that facilitates user 135 conducting a transaction with enterprise 110 or communicating with neural interface 136. In some embodiments, user device 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 115 may also comprise any suitable user interface such as a display, microphone, keyboard, or any other appropriate terminal equipment usable by user 135. It will be understood that system 100 may comprise any number and combination of user devices 115. User device 115 is operable to receive electromagnetic signals associated with user 135, generate a string of characters corresponding to the thought of user 135, and communicate a string of characters corresponding to the thought of user 135 to enterprise 110. In some embodiments, user device 115 communicates the string of characters to authenticate user 135 with enterprise 110. User device 115 interacts with TAM 140 by sending a first request from user 135 to perform a function with enterprise 110 and presenting a trigger to initiate the thought by user 135, as described below. In some embodiments, user device 115 uses the string of characters to generate a cryptographic key pair, as described below.

Neural interface 136 may refer to any device that facilitates retrieving electromagnetic signals from user 135 associated with the thoughts of user 135. In some embodiments, neural interface 136 may be a headset, chip, connection, or device capable of being a communication pathway from the brain to an external device. Neural interface 136 may be worn constantly by user 135 or worn only at certain times for neural interface 136 to measure and retrieve electromagnetic signals from the brain of user 135.

User device 115 may comprise thought module 116. Thought module 116 may refer to any suitable combination of hardware and/or software implemented in one or more modules to process data and provide the described functions and operations. In some embodiments, the functions and operations described herein may be performed by a pool of thought modules 116. In some embodiments, thought module 116 may include, for example, a mainframe, server, host computer, workstation, web server, file server, a personal computer such as a laptop, or any other suitable device operable to process data. In some embodiments, thought module 116 may execute on any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, thought module 116 receives electromagnetic signals associated with user 135 from neural interface 136 and, based at least in part upon the electromagnetic signals, generates a string of characters corresponding to the thought of user 135. Thought module 116 may receive the electromagnetic signals from neural interface 136 when user 135 generates the electromagnetic signals by developing a thought. For example, user 135 may think of a blue flower, which generates electromagnetic signals in the brain of user 135 that neural interface 136 measures. Once thought module 116 receives those signals from neural interface 136, thought module 116 generates a string of characters corresponding to user 135's thoughts of the blue flower. In some embodiments, thought module 116 communicates the generated string of characters from user device 115 to enterprise 110. In various embodiments, thought module 116 communicates the string of characters to CKGM 150 to facilitate generation of a cryptographic key or to facilitate authenticating user to unlock access to the private key of user 135, to TAM 140 to facilitation authentication of user 135, or to any other module or aspect of system 100.

In some embodiments, thought module 116 may present a trigger to initiate the thought of user 135. The trigger may be one or more images, one or more sounds, one or more smells, or information corresponding to an abstract concept. For example, the trigger may be an abstract image, such as an ink blot that is shown on the screen of user device 115, or a sound of a bird call that is played on user device 115. The trigger may be associated with user 135 in order to authenticate user 135 to perform a function with enterprise 110 or to receive access to the cryptographic key of user 135. For example, when user 135 attempts to log in to a website of enterprise 110, user 135 may have to type in a username and may be prompted with the trigger, such as a picture of a blue flower, to initiate a specific thought. The trigger may be stored in user device 115, in thought module 116, in enterprise 110, in thought database 125, or in TAM 140.

In some embodiments, thought module 116 may facilitate interaction between user 135 and a trigger to initiate the thought by user 135. The trigger may be a physical object or an edible item such that it cannot be displayed on the screen of user device 115 or played from the speakers of user device 115. For example, thought module 116 may communicate to user 135 to pick up a rock and throw it or to eat a spoonful of peanut butter. Continuing the example, while user 135 interacts with the trigger (by touching it, smelling it, tasting it, or a combination of these actions), neural interface 136 may capture the electromagnetic signals of the brain of user 135 that are initiated by user interacting with the trigger.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Enterprise 110 may refer to a financial institution, such as a bank, and may include one or more TAMs 140 and thought databases 125.

Thought database 125 may refer to any suitable device capable of storing and facilitating retrieval of a string of characters corresponding to the thought of user 135 and/or triggers associated with and operable to initiate the thought of user 135. Thought database 125 may store any number of strings of characters corresponding to any number of thoughts of any number of users 135. Thought database 125 may also store any number of triggers associated with any number of users 135. Examples of thought database 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates thought database 125 as external to TAM 140, it should be understood that thought database 125 may be internal or external to TAM 140, depending on particular implementations.

TAM 140 may refer to any suitable combination of hardware and/or software implemented in one or more modules to process data and provide the described functions and operations. In some embodiments, the functions and operations described herein may be performed by a pool of TAM servers 140. In some embodiments, TAM 140 may include, for example, a mainframe, server, host computer, workstation, web server, file server, a personal computer such as a laptop, or any other suitable device operable to process data. In some embodiments, TAM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, TAM 140 receives a request from user 135 to perform a function with enterprise 110, communicates a request for user 135 to provide a thought, receives a string of characters corresponding to the thought, compares the received string to a stored string that corresponds to the thought of user 135, and based at least in part upon the comparison, determines whether user 135 is authenticated to perform the requested function. In some embodiments TAM 140 may include processor 142, memory 145, and interface 151.

Memory 145 may refer to any suitable device capable of storing and facilitating retrieval of data and/or instructions. Examples of memory 145 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 145 as internal to TAM 140, it should be understood that memory 145 may be internal or external to TAM 140, depending on particular implementations. Also, memory 145 may be separate from or integral to other memory devices to achieve any suitable arrangement of memory devices for use in system 100.

Memory 145 is generally operable to store logic 146 and rules 147. Logic 146 generally refers to algorithms, code, tables, and/or other suitable instructions for performing the described functions and operations. Rules 147 refer to policies or directions for comparing the received string of characters corresponding to the thought of user 135 from user device 115 to a string of characters stored in memory 155 or thought database 125, and based on the comparison, determining whether user 135 is authenticated to perform the requested function. Rules 147 may be predetermined or predefined, but may also be updated or amended based on the needs of enterprise 110.

Memory 145 communicatively couples to processor 142. Processor 142 is generally operable to execute logic 146 stored in memory 145 to facilitate authentication of user 135 according to the disclosure. Processor 142 may comprise any suitable combination of hardware and software implemented in one or more modules to execute instructions and manipulate data to perform the described functions for TAM 140. In some embodiments, processor 142 may include, for example, one or more computers, one or more central processing units (CPUs), one or more microprocessors, one or more applications, and/or other logic.

In some embodiments, communication interface 141 (I/F) is communicatively coupled to processor 142 and may refer to any suitable device operable to receive input for TAM 140, send output from TAM 140, perform suitable processing of the input or output or both, communicate to other devices, or any combination of the preceding. Communication interface 141 may include appropriate hardware (e.g., modem, network interface card, etc.) and software, including protocol conversion and data processing capabilities, to communicate through network 120 or other communication system that allows TAM 140 to communicate to other devices. Communication interface 141 may include any suitable software operable to access data from various devices such as user devices 115 and thought database 125. Communication interface 141 may also include any suitable software operable to transmit data to various devices such as user devices 115. Communication interface 141 may include one or more ports, conversion software, or both. In general, communication interface 141 may receive a first request from user device 115 for user 135 to perform a function with enterprise 110, communicate a second request for user 135 to provide a thought to facilitate authenticating user 135 with enterprise 110, and receive a string of characters corresponding to the thought from user device 115.

In operation, logic 146 and rules 147, upon execution by processor 142, facilitate comparing the received string of characters corresponding to the thought of user 135 from user device 115 to a string of characters stored in memory 155 or thought database 125, and based on the comparison, determining whether user 135 is authenticated to perform the requested function. Logic 146 and rules 147 also facilitate communicating a trigger associated with the thought of user 135 to facilitate initiation of the thought of user 135.

In some embodiments, TAM 140 receives a string of characters corresponding to the thought of user 135. The string may be generated based at least in part upon electromagnetic signals generated by user 135 by developing the thought. For example, after receiving a request to provide a thought to facilitate authenticating user 135 with enterprise 110, user 135 may think of a specific thought such as a blue flower. By thinking of the blue flower, user 135 generates electromagnetic signals that thought module 116 may use to generate a corresponding string of characters. TAM 140 may receive the string of characters at interface 141 from user device 115 via network 120.

In some embodiments, TAM 140 may receive a first thought to authenticate user 135 to perform a function and store the string of characters corresponding to the first thought of user 135. TAM 140 may receive the first thought and corresponding string of characters when user 135 sets up an account or creates a relationship with enterprise 110. For example, user 135 may think of a blue flower as a thought to authenticate user 135 in the future, thought module 116 generates a string of characters corresponding to the thoughts of the blue flower and sends the string of characters to enterprise 110. Continuing the example, enterprise 110 stores this string of characters in order to authenticate user 135 to perform future functions with enterprise 110. TAM 140 may store the string of characters in thought database 125 or memory 145. TAM 140 may also store a trigger associated with the first thought of user 135 to facilitate initiation of the thought by user 135. For example, if user 135 thinks of a blue flower to produce the string of characters sent to TAM 140, TAM 140 may store a trigger such as the words "blue flower" or a picture of a blue flower.

In some embodiments, TAM 140 compares the received string of characters corresponding to the thought of user 135 to a stored string of characters that corresponds to a thought of user 135 to authenticate user 135. The stored string of characters may be a string saved by enterprise 110 when user 135 set up the account and the thought to authenticate user 135. When comparing the received string of characters and the stored string of characters, TAM 140 may determine whether the strings are identical. For example, both strings may contain 100 characters with each individual character being identical and in the same order as the other string. TAM 140 may also determine whether the strings are a partial match. For example, the stored string may contain 99 characters identical to and in the same order as the received string, but the received string may contain an extra character at the end. In this example, TAM 140 may determine the strings are only a partial match.

In some embodiments, TAM 140 determines whether user 135 is authenticated to perform the requested function based at least in part upon the comparison of the received string of characters and the stored string of characters. For example, if the received string of characters and the stored string of characters are an identical match, TAM 140 may determine user 135 is authenticated to perform the requested function. As another example, if the received string of characters and the stored string of characters are only a partial match or no match at all, TAM 140 may determine user 135 is not authenticated. In certain embodiments, TAM 140 may request additional information from user 135 if it determines the received string and the stored string are only a partial match. TAM 140, in some embodiments, may also communicate a response to user device 115 indicating whether user 135 is authenticated to perform the function. TAM 140 may communicate this response to user 135 from interface 141 to user device 115 via network 120.

In some embodiments, TAM 140 may communicate a trigger associated with the thought of user 135 to facilitate initiation of the thought. TAM 140 may communicate the trigger to user device 115 from interface 141 via network 140. The trigger may be one or more pictures, one or more images, one or more sounds, one or more smells, or other information corresponding to an abstract concept. For example, the trigger may be a picture of a blue flower or may be a series of images comprising a blue flower, a yellow flower, and a red flower. As another example, the trigger may be a sound that TAM 140 communicates to be played on user device 115, such as a few notes, a person laughing, a song, or a sound from nature, such as rainfall. Another example may be a smell that is emitted from user device 115, such as the smell of cookies in an oven, the smell of a blue flower, or the smell of a cleaning agent. In some embodiments, TAM 140 could communicate a message to user 135 through user device 115 to go and smell a certain object, rather than having the user device 115 emit the smell itself. TAM 140 may store the triggers themselves (e.g., a picture of a blue flower) or a cue associated with a trigger (e.g., think about a blue flower) in memory 145 or thought database 125. TAM 140 may communicate the trigger associated with user 135 automatically in response to receiving a first request from user 135 to perform a function with enterprise, at the same time as communicating a second request for user 135 to provide a thought to facilitate authenticating user 135 with enterprise 110, or in response to a request from user 135 to provide the trigger.

User device 115, in some embodiments, may also comprise CKGM 150. CKGM 150 may refer to any suitable combination of hardware and/or software implemented in one or more modules to process data and provide the described functions and operations. In some embodiments, the functions and operations described herein may be performed by a pool of CKGM servers 150. In some embodiments, CKGM 150 may include, for example, a mainframe, server, host computer, workstation, web server, file server, a personal computer such as a laptop, or any other suitable device operable to process data. In some embodiments, CKGM 150 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, CKGM 150 receives a string of characters corresponding to the thought of user 135 from thought module 116, and based at least in part upon the string of characters, generates a cryptographic key pair, which is configured to encrypt and decrypt messages. In some embodiments, CKGM 150 may include processor 152, memory 155, and interface 151.

Memory 155 may refer to any suitable device capable of storing and facilitating retrieval of data and/or instructions. Examples of memory 155 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 155 as internal to CKGM 150, it should be understood that server memory 155 may be internal or external to CKGM 150, depending on particular implementations. Also, memory 155 may be separate from or integral to other memory devices to achieve any suitable arrangement of memory devices for use in system 100.

Memory 155 is generally operable to store logic 156 and rules 157. Logic 156 generally refers to algorithms, code, tables, and/or other suitable instructions for performing the described functions and operations. Rules 157 generally refer to policies or directions for receiving a string of characters corresponding to the thought of user 135 and based at least in part upon the string of characters, generating a cryptographic key pair configured to encrypt and decrypt messages. Rules 157 may be predetermined or predefined, but may also be updated or amended based on the needs of enterprise 110.

Memory 155 communicatively couples to processor 152. Processor 152 is generally operable to execute logic 156 stored in memory 155 to facilitate generation of a cryptographic key pair, according to the disclosure. Processor 152 may comprise any suitable combination of hardware and software implemented in one or more modules to execute instructions and manipulate data to perform the described functions for CKGM 150. In some embodiments, processor 152 may include, for example, one or more computers, one or more central processing units (CPUs), one or more microprocessors, one or more applications, and/or other logic.

In some embodiments, communication interface 151 (I/F) is communicatively coupled to processor 152 and may refer to any suitable device operable to receive input for CKGM 150, send output from CKGM 150, perform suitable processing of the input or output or both, communicate to other devices, or any combination of the preceding. Communication interface 151 may include appropriate hardware (e.g. modem, network interface card, etc.) and software, including protocol conversion and data processing capabilities, to communicate through thought module 116 or other communication system that allows CKGM 150 to communicate to other devices. Communication interface 151 may include any suitable software operable to access data from various devices such as user devices 115 and thought database 125. Communication interface 151 may also include any suitable software operable to transmit data to various devices such as user devices 115. Communication interface 151 may include one or more ports, conversion software, or both. In general, communication interface 151 may communicate a request for user 135 to provide a thought and receive a string of characters corresponding to the thought from user device 115.

In operation, logic 156 and rules 157, upon execution by processor 152, facilitate receiving a string of characters corresponding to the thought of user 135 and based at least in part upon the string of characters, generating a cryptographic key pair configured to encrypt and decrypt messages. Logic 156 and rules 157 also facilitate communicating a trigger to facilitate initiation of the thought of user 135.

In some embodiments, CKGM 150 communicates a request for user 135 to provide a thought to facilitate generating a cryptographic key. CKGM 150 may communicate the request to user device 115 from interface 151. User 135 may be a customer of enterprise 110, an employee or administrator of enterprise 110, or a person remote to and with no relationship to enterprise 110. When communicating this request, CKGM 150 may also provide a message to user 135 regarding the type and/or number of thoughts to develop. For example, the message may instruct user 135 to think of any three separate images or may specify that user 135 should look at one object in the room for two seconds and then think of any abstract thought. In some embodiments, CKGM 150 could communicate a message to user 135 through user device 115 to pick up and touch a certain object, such as a rock to facilitate initiation of the thought.

In some embodiments, CKGM 150 receives a string of characters corresponding to the thought of user 135. The string may be generated based at least in part upon electromagnetic signals generated by user 135 by developing the thought. For example, after receiving a request to provide a thought to facilitate generating a cryptographic key, user 135 may think of any thought, such as what user 135 did the previous day. By thinking of the activities of user 135 from the previous day, user 135 generates electromagnetic signals that thought module 116 may use to generate a corresponding string of characters. CKGM 150 may receive the string of characters at interface 141 from thought module 116. In some embodiments, the string of characters correspond to the thought initiated by the message communicated from CKGM 150.

In some embodiments, based at least in part upon the received string of characters, CKGM 150 generates a cryptographic key pair, which facilitate the encryption and decryption of messages. The received string of characters may be a large random number used as input into a key generation program, which creates the cryptographic key pair. CKGM 150 may also use only part of the string of characters as input into a key generation program, or may split the string of characters into multiple sections and use it as multiple inputs into a key generation program.

In some embodiments, user device 115 requires user 135 to be authenticated in order to access the generated cryptographic key pair to encrypt any data. User 135 may develop a thought to generate electromagnetic signals captured by neural interface 136, and thought module 116 may receive the electromagnetic signals associated with the thought. Thought module 116 may generate a string of characters corresponding to the thought of user 135. Thought module 116 may communicate this string of characters to CKGM 140 to facilitate authenticating user 135 to access the cryptographic key pair. CKGM 140 may compare the received string to a stored string that corresponds to the thought of user 135 to authenticate user 135 and, based at least in part upon the comparison, determine whether user 135 is authenticated to use the cryptographic key pair. In some embodiments, user device 115 contains TAM 140, which may perform these steps to authenticate user 135, and then communicate a message to CKGM 150 that user 135 is authenticated.

In some embodiments, after CKGM 150 determines that user 135 is authenticated to use the cryptographic key pair, CKGM 150 may communicate a message to enterprise 110 that user 135 is authenticated. For example, if user 135 needs access to a public building, user 135 may develop the thought to authenticate user 135 with CKGM 150, which then communicates the authentication to the building after determining user 135 is authenticated. For example, CKGM 150 may communicate the public key of the cryptographic key pair to prove the authentication of user 135. This embodiment allows for a simpler and user-friendly way to access secure areas, websites, and/or data because user 135 only has to remember one thought or set of thoughts, rather than separate thoughts for each type of or place to access.

In some embodiments, CKGM 150 may receive data to encrypt with the generated keys. CKGM 150 may receive any type of data to encrypt, such as for example, a computer file, a folder containing multiple files, programs, documents, pictures, or any other suitable type of data that is able to by encrypted. In some embodiments, the data to be encrypted is a string of characters corresponding to a thought of user 135. For example, user 135 may first provide a thought to be authenticated with CKGM 150 to access the cryptographic key pair and then provide a separate thought to be authenticated with enterprise 110. Continuing the example, if CKGM 150 determines user 135 is authenticated, it may encrypt the string of characters corresponding to the thought of user to authenticate user 135 with enterprise 110, and then communicate the encrypted string of characters to enterprise 110. Enterprise 110 may use the public key of the cryptographic key pair to decrypt the string of characters. TAM may compare the received string to the stored string and, based at least in part upon the comparison, determine whether user 135 is authenticated to perform the function with enterprise 110.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of users 135, neural interfaces 136, user devices 115, networks 120, enterprises 110, TAMs 140, CKGMs 150, or thought databases 125. In addition, particular modules, such as thought module 116, TAM 140, or CKGM 150, may be within or external to user device 115 or within or external to enterprise 110. As another example, particular functions, such as generating a string of characters corresponding to the thought of user 135 may be performed by a separate component than thought module 116. As another example, generating a cryptographic key pair may be performed by a separate component and CKGM 140 receives the information regarding the key pair. As an additional example, comparing the received string to a stored string that corresponds to the thought of user 135 may be performed by a separate component and TAM 140 may receive the information regarding the comparison. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates an example flow chart for facilitating neural authentication. At step 202, in some embodiments, TAM 140 may receive a first string of characters corresponding to a first thought from user 135 via user device 115 to authenticate user 135 to perform a function with enterprise 110. The first string of characters may be generated by thought module 116, similar to the techniques described in steps 216, 218, and 220 below. For example, user 135 may set up an account with enterprise 110 and choose a thought to be used to authenticate user 135 in the future. Continuing the example, user 135 may pick a certain image, such as an image of a blue flower, and look at the picture of the blue flower to develop a thought associated with the picture of the blue flower. Neural interface 136 may receive the electromagnetic signals generated by user 135 looking at the picture of the blue flower, and based at least in part upon the electromagnetic signals, generate a string of characters corresponding to the thought of user 135 when looking at the picture of the blue flower. Continuing the example, TAM 140 may receive the first string of characters corresponding to the first thought of user, for example the thought of looking at the blue flower trigger, from user device 115 via network 120.

At step 204, TAM 140 may store the first string of characters corresponding to the first thought of user 135 and received at step 202. TAM 140 may store the first string of characters in memory 145, in thought database 125, or in another memory suitable to store the string of characters in enterprise 110. TAM 140 may also store a trigger that corresponds to the first string of characters. For example, if the trigger to initiate the thought of user 135 is an image of a blue flower, then TAM 140 may store the image of the blue flower in thought database 125 and/or memory 145. User 135 may store the trigger on user device 115 in addition to TAM 140 storing it or instead of TAM 140 storing it.

In step 206, in some embodiments, TAM 140 may receive a first request from user 135 via user device 115, for user 135 to perform a function with enterprise 110. TAM 140 may receive the first request from user device 115 via network 120 at interface 141. The requested function may be any activity user 135 can use enterprise 110 to perform, for example, opening an account transferring funds making a purchase, changing a password, changing a user name, changing an email address associated with an account, or closing an account with enterprise 110.

At step 208, in some embodiments, TAM 140 may communicate a second request directed to user 135 to provide a thought of user 135 to authenticate user 135 with enterprise 110. TAM 140 may communicate the second request from interface 141 to user device 115 via network 120. In some embodiments, TAM 140 may communicate the second request automatically in response to receiving the first request from user 135 to perform a function with enterprise 110. In some embodiments, the request may appear on user device 115, for example, telling the user to enter a username and developing the thought to authenticate user 135.

At step 210, in some embodiments, TAM 140 may communicate a message to user 135 regarding the type of thought to develop in order to authenticate user 135 and user device 115 may display the message to user 135 at step 212. TAM 140 may determine that certain types of thoughts are more secure than others and may include certain requirements for the types of thoughts in rules 147. For example, TAM 140 may require user 135 to develop a thought while looking at three or more images. The thoughts developed while looking at three separate images may produce a longer string of characters, which creates a more secure authentication of user 135. As another example, TAM 140 may require user 135 to develop a thought while first looking at an image, second touching an object, and third smelling an object. The thoughts developed while using three separate senses may produce a longer or more complicated string of characters, which makes it more difficult for a third-party attempting to access the account of user 135, and thus reduces the risk of fraud. In some embodiments, the message from TAM 140 may include specific triggers as explained in steps 214 and 216 below.

At step 214, in some embodiments, TAM 140 may communicate a trigger associated with the thought of user 135 to authenticate user 135 with enterprise 110. TAM 140 may communicate the trigger from interface 141 to user device 115 via network 120. The trigger may be stored in memory 145 and/or a thought database 125. The trigger may be any image, sound, text, abstract thought, or combination of the proceeding items in order to initiate the thought of user 135. For example, the trigger may be an image of a blue flower, the text "think of how a blue flower smells," the sound of a person crying, or a movie clip that combines visual images and sounds. In some embodiments, the trigger may be a combination of various individual triggers. For example, the trigger may comprise an image of a red balloon and the sound of a wolf howling.

At step 216, in some embodiments, user device 115 may present the trigger to initiate the thought by user 135. In some embodiments, the trigger may be presented at user device through its audio equipment or through its screen. For example, showing an image showing an image of a blue flower or playing the sound of a person crying. In some embodiments, the trigger may be saved on user device 115 and thus step 214 may be omitted because the trigger may be accessed from user device 115 rather than being communicated from TAM 140.

At step 218, in some embodiments, user device 115 may facilitate interaction between user 135 and the trigger to initiate the thought by user 135. For example, user device 115 may present information to user 135 to pick up a pen and write a certain word with it, to press the button of a mouse, to fold a piece of paper, to lick an envelope, to eat a spoonful of sugar, or to perform a physical activity, such as taking a step forward, taking a step back, doing a jumping jack, or scratching the head of user 135. In some embodiments, this text to facilitate interaction between user 135 and trigger may be stored in user device 115, such as thought module 116, or may be communicated from TAM 140, such as in step 214. In some embodiments, step 216 may be omitted if the trigger is not something that may be presented to user 135. For example, if the trigger is not something that can be displayed or sounded from user device 115, then user device 115 may display a message to tell user 135 what to do with a trigger, rather than display the trigger itself.

In step 220, in some embodiments, user device 115 receives electromagnetic signals associated with user 135. These electromagnetic signals may be sent to user device 115 or thought module 116 from neural interface 136. Neural interface 136 may be connected to the head of user 135 in order to receive the electromagnetic signals. The electromagnetic signals are generated by user 135 when developing the thought. In some embodiments, the thought is associated with the message communicated and displayed to user 135 in steps 210 and 212, the trigger presented in step 216 and/or communicated from TAM 140 in step 214, or the thought may be just a random thought by user 135. Thought module 116 may contain an interface that receives the electromagnetic signals from neural interface 136.

At step 222, in some embodiments, thought module 116 generates a string of characters corresponding to the thought of user 135 based at least in part upon the electromagnetic signals received in step 220. For example, if user 135 develops a thought of an image of an oak tree, the generated string of characters would correspond to the electromagnetic signals generated by user 135 by developing the thought of an image of the oak tree. The string of characters may include any number of letters, numbers, symbols, or characters. For example, the string of characters may be one long series of 100 various numbers or may be a string of 27 characters comprising letters and numbers.

At step 224, in some embodiments, thought module 116 communicates the string of characters corresponding to the thought of user 135 to enterprise 110. Thought module 116 may communicate the string of characters to interface 141 of TAM 140 via network 120 in order to facilitate authentication of user 135 with enterprise 110. At step 226, in some embodiments, TAM 140 receives the string of characters corresponding to the thought of user 135. TAM may receive the string of characters at interface 141 via network 120 from user device 115 or thought module 116.

At step 228, in some embodiments, TAM 140 compares the received string of characters corresponding to the thought of the user 135 to a stored string, such as the string stored at step 204 in memory 145 and/or thought database 125. For example, if in step 202, user 135 looked at an image of a cat, neural interface 136 captured the electromagnetic signals generated by user 135 while thinking of the cat, thought module 116 generated the first string of characters corresponding to the thought of the cat, and thought module 116 sent the string of characters to TAM 140 to be stored. Continuing the example, if user 135 was presented with a trigger to think of a cat in step 216, and thought of the cat, then the received string at step 226 would match the stored string from step 204. In some embodiments, TAM 140 may find that the received string and the stored string are an identical match, a partial match, or no match at all.

At step 230, in some embodiments, TAM 140 may determine whether the user 135 is authenticated to perform the requested function based at least in part upon the comparison in step 228. For example, TAM 140 may determine that a partial match of the received string and the stored string is sufficient to authenticate user 135. As another example, TAM 140 may determine that a partial match between the received string and the stored string is not sufficient to authenticate user 135 to perform the requested function. As another example, TAM 140 may require the received string and the stored string to be an identical match in order for user 135 to be authenticated to perform the function with enterprise 110.

At step 232, in some embodiments, TAM 140 may communicate a response that user 135 is authenticated to perform the function with enterprise 110 if, TAM 140 determines that user is authenticated in step 230 and the method ends. TAM 140 may communicate the response from interface 141 to user device 115 or thought module 116 via network 120. For example, TAM may communicate a textual response to be displayed on user device 115 that user is authenticated and to inform user to proceed with the requested function. If, in step 230, TAM 140 determines user 135 is not authenticated to perform the function then at step 234, in some embodiments, TAM 140 may communicate a response that user 135 is not authenticated to perform the requested function received in step 206. TAM 140 may communicate the response that user 135 is not authenticated from interface 141 to user device 115 via network 120. In some embodiments, TAM 140 may also communicate a request directed to user 135 to provide a different thought, which may be performed similar to the techniques described above in step 208. For example, TAM 140 may send a message to user device 115 that user authentication failed and to develop a different thought that may authenticate user 135. After this, the method ends.

Modifications, additions, or omissions may be made to the methods described herein without departing from the scope of the invention. For example, the steps may be combined, modified, or deleted where appropriate, and additional steps may be added. For example, steps 214 and 216 may be omitted and, rather than present the trigger to user 135, user device 115 may facilitate interaction between user 135 and the trigger in step 218. Additionally, the steps may be performed in any suitable order without departing from the scope of the present disclosure. For example, communicating the trigger in step 214 may be performed before or instead of communicating a second request directed to user 135 to present a thought of user 135 in step 208. While discussed as TAM 140 and user device 115 performing the steps, any suitable component of system 100 may perform one or more steps of the method.

FIG. 3 illustrates an example flow chart facilitating cryptographic key generation. At step 302, in some embodiments, CKGM 150 may communicate a request for user 135 to provide a thought to facilitate generating cryptographic keys. CKGM 150 may communicate the request from interface 151 to user device 115 via network 120.

At step 304, in some embodiments, CKGM 150 communicates a message to user 135 regarding the type of thought to develop and user device 115 may display the message to user 135 at step 306. For example, the message may instruct user 135 to look around the room for five seconds or to find a random image and think about it. In certain embodiments, CKGM 150 may communicate a message to user 135 instructing user 135 to think of a certain number of thoughts.

For example, the message may instruct user 135 to think of one discrete thought, or 6 different discrete thoughts. In some embodiments, the message may including information regarding the type of thought and the number of thoughts to develop, as shown in examples below. CKGM 150 may determine that certain types of thoughts are more secure than others and may include certain requirements for the types and number of thoughts in rules 147. For example, CKGM 150 may require user 135 to develop a thought while looking at three or more images. The thoughts developed while looking at three separate images may produce a longer string of characters, which leads to generation of a more secure cryptographic key pair. As another example, CKGM 150 may require user 135 to develop a thought while first looking at an image, second touching an object, and third smelling an object. The thoughts developed while using three separate senses may produce a longer and/or more complicated string of characters, which makes it more difficult for a third-party attempting to duplicate the cryptographic key pair, and thus increases the security provided by the key pair encryption and decryption. In some embodiments, steps 304 and 306 may be performed instead of step 308, described below. For example, if CKGM 150 provides instruction on the type of thoughts to develop, then CKGM 150 may omit steps 308 because it may not also need to facilitate interaction between user 135 and a physical trigger.

At step 308, in some embodiments, user device 115 may facilitate interaction between user 135 and the trigger to initiate the thought by user 135. For example, the trigger may not be something that can be presented (e.g., through sound or display) on user device 115, thus user device 115 may provide instructions to user 135 to interact with the trigger. For example, the trigger may be a household object, such as, a piece of paper and the instructions may be to fold the piece of paper in half. As another example, user device 115 may facilitate interaction between user 135 and a trigger such as instructing user 135 to walk up and down a step one time. User device may also facilitate interaction between user 135 by, for example, instructing user 135 to taste a chocolate chip cookie.

At step 310, user device 115 or thought module 116 may receive electromagnetic signals associated with user 135. These electromagnetic signals may be received from neural interface 136. Neural interface 136 may measure the electromagnetic signals of the brain of user 135 while user 135 is developing the thought. In some embodiments, the thought is associated with the message communicated and displayed to user 135 in steps 304 and 306, the trigger that user 135 interacted with at step 308, or the thought may be just a random thought by user 135. Neural interface 136 may then send the measured electromagnetic signals to thought module 116.

At step 312, in some embodiments, thought module 116 may generate a string of characters corresponding to the thought of user 135 based at least in part upon the electromagnetic signals received at step 310. For example, if user 135 develops a thought of an image of a red car, the generated string of characters would correspond to the electromagnetic signals generated by user 135 by developing the thought of an image of a red car. The string of characters may include any number of letters, numbers, symbols, or characters. For example, the string of characters may be one long series of 100 various numbers or may be a string of 27 characters comprising letters and numbers.

At step 314, in some embodiments, thought module 116 may communicate the string of characters corresponding to the thought. For example, thought module 116 may send the string of characters to interface 151 of CKGM 150. At step 320, CKGM 150 receives the string of characters corresponding to the thought, which was sent by thought module 116 or user device 115 via network 120 to interface 151 of CKGM 150.

At step 318, in some embodiments, CKGM 150 generates an asymmetric key pair based at least in part on the received string. The cryptographic, asymmetric key pair may be configured to encrypt and decrypt messages. The received string of characters may be a large random number used as input into a key generation program, which creates the cryptographic key pair. CKGM 150 may also use only part of the string of characters as input into a key generation program, or may split the string of characters into multiple sections and use it as multiple inputs into a key generation program.

At step 320, CKGM 150 deletes the received string of characters corresponding to the thought of user 135. In certain embodiments, it is necessary to delete the string of characters to ensure the security of the cryptgraphic key pair. If someone is able to reconstruct or regenerate the key pair, then user 135 would be unable to encrypt data with the assurance that no one else may decrypt the data. After deleting the received string of characters corresponding to the thought of user 135 the method ends.

Modifications, additions, or omissions may be made to the methods described herein without departing from the scope of the invention. For example, the steps may be combined, modified, or deleted where appropriate, and additional steps may be added. For example, steps 308 may be omitted and rather than facilitate interaction between user 135 and a physical trigger, user device 115 may communicate and display a message to user 135 regarding the type of thought for user 135 to develop in steps 304 and 306. Additionally, the steps may be performed in any suitable order without departing from the scope of the present disclosure. While discussed as CKGM 150 and user device 115 performing the steps, any suitable component of system 100 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A cryptographic key pair generation system, comprising: an interface configured to:
communicate a request for a user to provide a thought to facilitate generating a cryptographic key pair;
receive a request for a first trigger, the first trigger to facilitate initiating the thought by the user;
transmit the first trigger, the first trigger comprising a sound for the user to listen to and a message to the user to interact with a physical object;
receive a string of characters corresponding to the thought, wherein the string is generated based at least in part upon electromagnetic signals, and the user generates the electromagnetic signals by developing the thought associated with the first trigger;
receive a request to access the cryptographic key pair to encrypt data;
in response to receiving the request to access the cryptographic key pair, transmit a second trigger to be presented to the user, the second trigger associated with a second thought to facilitate authenticating the user to access the cryptographic key pair;

receive a second string of characters corresponding to the second thought, wherein the second string of characters is generated based at least in part upon second electromagnetic signals, and the user generates the second electromagnetic signals by developing the second thought;

in response to determining that the user is authenticated to access the key pair, transmit a message that the user is authenticated and requesting the data to encrypt; and receive the data; and one or more processors communicatively coupled to the interface and configured to:

generate a cryptographic key pair based at least in part upon the string of characters, the cryptographic key pair configured to encrypt and decrypt data;

delete the string of characters corresponding to the thought;

compare the second string of characters to a stored string that corresponds to a stored thought of the user to authenticate the user;

based at least in part upon the comparison, determine whether the user is authenticated to access the cryptographic key pair; and encrypt the data using the cryptographic key pair.

2. The system of claim 1, wherein the key pair comprises a public key facilitating encryption of data and a private key associated with the public key facilitating decryption of the data.

3. The system of claim 1, wherein the interface is further configured to facilitate interaction between the user and a trigger to initiate the thought by the user, wherein the trigger comprises a selected one of one or more physical objects and one or more edible items.

4. The system of claim 1, wherein the interface is configured to communicate a message to the user regarding the type of thought to develop.

5. A cryptographic key pair generation method, comprising:

communicating, using an interface, a request for a user to provide a thought to facilitate generating a cryptographic key pair;

receiving, at the interface, a request for a first trigger, the first trigger to facilitate initiating the thought by the user;

transmitting, at the interface, the first trigger, the first trigger comprising a sound for the user to listen to and a message to the user to interact with a physical object;

receiving, at the interface, a string of characters corresponding to the thought, wherein the string is generated based at least in part upon electromagnetic signals, and the user generates the electromagnetic signals by developing the thought associated with the first trigger;

based at least in part upon the string of characters, generating, using a processor, a cryptographic key pair, the cryptographic key pair configured to encrypt and decrypt data;

deleting, using the processor, the string of characters corresponding to the thought;

receiving, at the interface, a request to access the cryptographic key pair to encrypt data;

in response to receiving the request to access the cryptographic key pair, transmitting, at the interface, a second trigger to be presented to the user, the second trigger associated with a second thought to facilitate authenticating the user to access the cryptographic key pair;

receiving, at the interface, a second string of characters corresponding to the second thought, wherein the second string of characters is generated based at least in part upon second electromagnetic signals, and the user generates the second electromagnetic signals by developing the second thought;

comparing, using the processor, the second string of characters to a stored string that corresponds to a stored thought of user to authenticate the user;

based at least in part upon the comparison, determine whether the user is authenticated to access the cryptographic key pair;

in response to determining that the user is authenticated to access the key pair, transmitting, using the interface, a message indicating that the user is authenticated and requesting the data to encrypt;

receiving, at the interface, the data; and encrypting, using the processor, the data using the cryptographic key pair.

6. The method of claim 5, wherein the key pair comprises a public key facilitating encryption of data and a private key associated with the public key facilitating decryption of the data.

7. The method of claim 5, further comprising communicating, using the interface, a message to the user regarding the type of thought to develop.

8. The method of claim 7, wherein the message instructs the user to develop a certain number of thoughts.

* * * * *